Patented Apr. 1, 1930

1,753,018

UNITED STATES PATENT OFFICE

ALLEN F. OWEN, OF JACKSON HEIGHTS, NEW YORK, ASSIGNOR TO THE NAUGATUCK CHEMICAL COMPANY, OF NAUGATUCK, CONNECTICUT, A CORPORATION OF CONNECTICUT

TREATING VULCANIZED OILS

No Drawing.    Application filed October 1, 1926.    Serial No. 139,019.

This invention relates to processes of treating vulcanized oils known as factice or rubber substitute or other similar materials and to the products obtained thereby. It is more particularly directed to a process for forming a dispersion of factice and to the resultant dispersion.

It has been known that rubber or shoddies either compounded or uncompounded can be dispersed in a non-solvent medium.

The vulcanized oils have long been used in the mill type of rubber compounds, particularly in cheap stocks such as erasers, where a highly compounded stock is desired which will at the same time be elastic and rubber like. The customary way of adding the rubber substitute to the rubber has been by mixing them together on the mill. This method is not, however, always practicable as, for example, if it is desired to compound the rubber substitute with latex or other dispersion of rubber and then use the resultant dispersed mixture as such.

An object of my invention is to disperse factice in water so that the particles of rubber substitute are held in a fine state of suspension.

Another object of my invention is to so condition factice that it may be compounded with a rubber dispersion such as latex.

With these and other objects in view my invention consists broadly in mixing factice with dispersing agents and a non-solvent such as water, until a dispersion of the factice is obtained. Such a dispersion when dried yields a product which appears to have all the properties of the original material. The invention consists further in subsequently mixing the dispersed factice, in varying amounts, with a cured or uncured rubber dispersion such as either natural or artificial latices.

To illustrate this invention by means of a specific example, the procedure is as follows:

Into a suitable mixer, such as a Werner & Pfleiderer, I place a quantity of white substitute. Heat is applied and the batch mixed or masticated for a period of a few minutes until the rubber substitute softens to a plastic condition. Dispersion agents are then added preferably in a dry condition and the mixing operation is continued for a short time in the presence of heat. When the dispersion agents have been thoroughly incorporated hot water is added. The water is added in small amounts since it is absorbed by the batch slowly. The color of the mixture steadily whitens as the water is added, the batch takes the form of a paste and finally "breaks" as the continuous phase changes to water.

A suitable formula for such a dispersion may be as follows:

500 parts by weight_____ white substitute
25 parts by weight_____ Karaya gum
15 parts by weight_____ saponin
500 parts by weight_____ water In carrying out the invention, I prefer to use a rubber substitute known as factice or vulcanized oil. This is the compound obtained by heating various glyceride oils with sulphur or its compounds. Examples of such oils are corn, cotton seed, rape seed and linseed. The oils so treated may be either raw or blown and they may be treated with sulphur alone or with a sulphur compound such as sulphur chloride. Sulphur chloride yields a light colored product known as white substitute, and either these or the darker colored compounds obtained by treating with sulphur can be used in my invention. These rubber substitutes are insoluble in most organic solvents and in water, and in general inert chemically.

The Karaya gum and saponin may be replaced with more or less satisfactory results by other dispersing agents such as glue, casein, silurian shale, china clay, soaps and substances of a similar nature. It is of course, understood that the materials used in obtaining the dispersions may be varied in percentage as well as in number and kind. The amount of water added after the paste has broken may be varied according to whether a thick paste of dispersed factice or a thin latex-like product is desired. Other non-solvent liquid may be used if desired. Preferably such liquid is used as will mix with water. If it is desired to compound pigments with the factice they may be mixed with it either prior to or along with the dispersing agents. The step of mixing and heating the factice to soften it may be omitted.

The product obtained by this process is a uniform dispersion somewhat resembling rubber latex. The particles of factice are highly dispersed and remain stable for prolonged periods of time. The dispersion when mixed with large amounts of water shows no separation or agglomeration.

Dispersed factice has a great variety of applications among which is its use in varying amounts in vulcanized and unvulcanized latex. It mixes readily with latex giving a paste that is very stable to rubbing and which does not separate after long periods of time. Examples of mixes of the dispersed factice with latex are as follows:

| Unvulcanized latex | Parts of solids by weight | | |
|---|---|---|---|
| Rubber as ammonia preserved latex containing 33% solids | 100 | 100 | 100 |
| White rubber substitute (as water dispersion containing 48% factice) | 50 | 150 | 150 |
| Gilder's whiting | | | 150 |
| Added water | | | 150 |

| Vulcanized latex | Part of solids by weight |
|---|---|
| Rubber as cured latex containing 35% solids | 100 |
| White rubber substitute (as water dispersion containing 48% factice) | 50 |

It is possible to incorporate with the latex and factice any desired compounding ingredient such as clays and other fillers, and vulcanizing ingredients such as sulphur, accelerators and accelerating combinations. Instead of natural latex artificial dispersions of rubber may be used.

Dried films of these mixes are rubbery, have good strength and are quite transparent. The film containing 50 parts of the factice on 100 of rubber as latex upon being heated for as long a time as 36 hours at 175° F. does not become tacky or apparently lose any strength. These rubber substitute dispersions are of value in latex compounding inasmuch as they give a product of rubber-like qualities even when highly compounded as contrasted with the non-elastic properties of highly compounded latex containing inelastic fillers only.

Some of the uses to which the dispersion in the latex compounds may be put are for grease and water-proof coatings, adhesives, spread goods backing compounds for carpets, the impregnation of upholstery materials for furniture, and for latex paper made in the beater. In fact, it can be used in almost all of the present applications of latex.

The term rubber substitute as used in the claims is meant to include materials generally comprehended by factice or vulcanized oil. The term latex is meant to include both natural and artificial latices.

Having thus described my invention, what I claim and desire to protect by Letters Patent is:

1. The process of dispersing rubber substitute in water which comprises softening a mass of white substitute by heat and mastication, directly thereafter incorporating Karaya gum and saponin therewith and agitating the mixture with gradual addition of water until the white substitute is dispersed in the water.

2. The method of incorporating factice into an aqueous dispersion of rubber which comprises dispersing the factice in a water miscible liquid and mixing the dispersion of factice with an aqueous dispersion of rubber.

3. The method of incorporating factice into latex which comprises mixing the factice with a dispersion agent, dispersing the mixture in water, and mixing the aqueous dispersion of the factice with latex.

4. The method of incorporating factice into latex which comprises dispersing the factice, compounding material and a dispersion agent in water and mixing the product with latex.

5. As a new product, a stable aqueous dispersion of rubber containing dispersed factice in which water constitutes a continuous phase.

6. As a new product, a stable aqueous dispersion of rubber containing dispersed compounded factice in which water constitutes a continuous phase.

7. As a new product, a latex containing dispersed factice.

Signed at New York, county of New York, State of New York, this 28th day of September, 1926.

ALLEN F. OWEN.